(12) United States Patent
Santina

(10) Patent No.: US 6,926,878 B2
(45) Date of Patent: Aug. 9, 2005

(54) METHOD FOR REMOVING TOXIC SUBSTANCES IN WATER

(76) Inventor: Peter F. Santina, 1923 Whitecliff Way, Walnut Creek, CA (US) 94596

( * ) Notice: Subject to any disclaimer, the term of this patent is extended or adjusted under 35 U.S.C. 154(b) by 0 days.

(21) Appl. No.: 10/442,864

(22) Filed: May 21, 2003

(65) Prior Publication Data

US 2003/0196961 A1 Oct. 23, 2003

Related U.S. Application Data

(60) Continuation-in-part of application No. 09/952,876, filed on Sep. 14, 2001, now abandoned, which is a continuation-in-part of application No. 09/624,713, filed on Jul. 25, 2000, now abandoned, which is a continuation of application No. 09/241,258, filed on Feb. 1, 1999, now Pat. No. 6,093,328, which is a continuation-in-part of application No. 08/742,652, filed on Nov. 4, 1996, now Pat. No. 5,866,014, which is a division of application No. 08/352,383, filed on Dec. 8, 1994, now Pat. No. 5,575,919.

(51) Int. Cl.$^7$ .............................................. C01G 49/12
(52) U.S. Cl. ....................... 423/565; 210/716; 252/175; 252/178
(58) Field of Search .................................. 210/715, 716, 210/717, 719, 721, 724, 726, 737, 902, 908, 909, 911, 912, 695; 423/87, 601, 602, 561.1, 565; 252/175, 178

(56) References Cited

U.S. PATENT DOCUMENTS

| | | | | |
|---|---|---|---|---|
| 5,200,082 A | * | 4/1993 | Olsen et al. ................. | 210/667 |
| 5,575,919 A | * | 11/1996 | Santina ........................ | 210/695 |
| 5,866,014 A | * | 2/1999 | Santina ........................ | 210/716 |
| 6,093,328 A | * | 7/2000 | Santina ........................ | 210/679 |

* cited by examiner

Primary Examiner—Peter A. Hruskoci
(74) Attorney, Agent, or Firm—Thomas M. Freiburger

(57) ABSTRACT

Arsenic and TOC are removed from drinking water or wastewaters by use of finely-divided metallic iron in the presence of powered elemental sulfur or other sulfur compounds such as manganese sulfide, followed by an oxidation step. A premix may be produced for this process, by adding the iron, sulfur and oxidizing agent to water in a predetermined pH range. The iron and sulfur are mixed for a period of time dependent upon the temperature and pH of the water and the presence of complexing or sequestering minerals and organic acids in the water. An oxidizing agent is added to the mixture and agitating is continued. In a preferred embodiment the oxidizing agent is hydrogen peroxide. Water is decanted from the mixture after a sufficient reaction time, to produce a concentrated premix. This premix can be added to water intended for drinking or to industrial effluents containing toxic materials. Use of various gradations and mixtures of this sulfur-modified iron (SMI) premix have been successfully demonstrated to remove the following toxic substances from water: arsenic (arsenite and arsenate); disinfection byproducts and precursors; copper; chrome VI; sulfate; and chlorinated solvents including trichloroethene. Metals removed may be present in the untreated water in either the dissolved state or as a fine particulate. SMI has been fabricated using sulfur in the amount of up to 50% of the weight of the iron. SMI premix has been manufactured using a wetted but non-fluid mix at room temperature and at elevated temperature. SMI has been successfully demonstrated in pressure and gravity contact beds in both upflow and downflow modes. It has been prepared in uniformly-graded media similar in size and gradation to commercially-available filter media. Spent SMI can be recycled as a non-hazardous material as feed material to a steel production facility.

5 Claims, 4 Drawing Sheets

METHOD FOR REMOVING TOXIC SUBSTANCES IN WATER

This is a continuation-in-part of application Ser. No. 09/952,876, filed Sep. 14, 2001, now abandoned, which was a continuation-in-part of application Ser. No. 09/624,713, filed Jul. 25, 2000, now abandoned which was a continuation of application Ser. No. 09/241,258, filed Feb. 1, 1999, now U.S. Pat. No. 6,093,328, which was a continuation-in-part of application Ser. No. 08/742,652, filed Nov. 4, 1996, now U.S. Pat. No. 5,866,014, which was a division of application Ser. No. 08/352,383, filed Dec. 8, 1994, now U.S. Pat. No. 5,575,919.

BACKGROUND OF THE INVENTION

This invention is directed to a method and system which removes several regulated, toxic mineral and organic precursor substances from drinking water or wastewater by causing them to be absorbed and adsorbed onto sulfur-activated sponge iron particles, which may be referred to as "sulfur-modified iron". Specifically, the method and system removes from water trace amounts of (1) dissolved, colloidal, and particulate arsenic, selenium, and lead; and (2) naturally-occurring organic compounds (TOC, total organic carbon in the water), which, when oxidized, form "disinfection byproducts"; and (3) other potentially harmful minerals.

The subject matter of this invention is related to some extent to that of U.S. Pat. Nos. 4,940,549 and 5,200,082, which are directed to removal of selenium from agricultural drain water and from refinery effluents and other industrial waste waters. See also U.S. Pat. Nos. 5,575,919, 5,866,014 and 6,093,328.

The process of the present invention is particularly concerned with removal of arsenic and other toxic metals, and lowering the level of TOC from drinking water, using some of the same steps which were found efficacious in removal of selenium in the above referenced patents.

Recent scientific investigations by the United States Environmental Protection Agency (EPA) and others have suggested that arsenic in drinking water causes cancer in humans; that no quantity of arsenic in drinking water is a safe quantity; that arsenic may not be an essential human nutrient as previously reported by science; and that the cancer risk from ingesting arsenic at the currently permitted level in drinking water may equal that caused by smoking cigarettes. The EPA currently is negotiating the content of the regulations for arsenic in drinking water and it projects that the new limitation will be between 2 and 5 micrograms per liter ($\mu$g/L), most probably 2 $\mu$g/L.

Many existing water systems will have to treat to reduce the concentration of arsenic. Three examples follow:

(a) The California State Water Project which has naturally-occurring arsenic in the amount of 2 to 6 $\mu$g/L provides water for several million families;

(b) The City of Hanford, Calif. gets its drinking water for more than 20,000 people from ground water wells. Some of the wells have arsenic concentrations near the current limit of 50 $\mu$g/L;

(c) The Kern Water Bank is a project constructed to store water in underground reservoirs in times of plenty for use when water is not available. Some of the Water Bank wells have naturally-occurring arsenic. In a few, the arsenic concentration approaches 200 $\mu$g/l.

Water providers have an immediate need for an economical, safe method to remove arsenic from drinking water. Current methods, systems, and technologies have either proved to be uneconomical or ineffective to meet the proposed 2 $\mu$g/L standard. The test for economical water service is as follows: Is the cost of water less than two percent of the gross income of a family at the poverty level?

Existing technologies for removal of arsenic include the following: (a) adsorption onto activated alumina within a fixed bed contactor; (b) complexing arsenic with hydrous metallic floc, primarily aluminum and iron hydroxides or oxyhydroxides, in conventional water treatment plants; (c) sieving the metal from water by membrane technologies such as reverse osmosis; and (d) electro-dynamic processes such as electrodialysis. The present invention described below can exhibit a cost advantage of 5 to 15 times compared to these prior methods.

Also, since the middle 1970s, the EPA has warned that certain classes of byproducts formed by oxidizing naturally-occurring organic acids during disinfection are potentially carcinogenic. These compounds are regulated as "disinfection byproducts" (DBPs) to limit consumption. There are many DBP compounds of interest to EPA. Not all have been fully described or investigated with respect to their potential effects on human health or the frequency of their occurrence in domestic water systems. In addition, the epidemiological impact of DBPs is uncertain. Hence, there is a concerted effort of national scope to develop data on the formation of DBPs and to better define their potential impact on human health.

The EPA is currently requiring more water systems to disinfect their water to limit the occurrence of waterborne disease, while at the same time the EPA is seeking to reduce the impacts of DBPs on human health; these can be conflicting purposes. Most water systems disinfect their water. Thus, many water systems will have to initiate or modify water treatment systems to reduce DBPs to meet proposed trihalomethane limitations which may range from 40 to 60 $\mu$g/L. Other DBPs, such as haloacetic acids and several bromine compounds, will be subject to numerical concentration limits. Conventional treatment systems for surface water sources may meet many of the proposed standards if influent precursors, i.e. TOCs, can be limited to 4 mg/L prior to disinfection with chlorine.

Thus, across the United States, water providers have an immediate need for an economical, safe method to reduce the occurrence of DBPs in drinking water. Current methods, systems, and technologies have either proved to be uneconomical or ineffective to meet the proposed 40 to 60 $\mu$g/L standard. The EPA has been proposing stringent limitations on the class of DBPs known as trihalomethanes, cited above, since 1975. Water providers have often failed to meet the most basic requirement that total trihalomethanes be less than 100 $\mu$g/L.

As noted above, the primary strategy presently used to reduce DBPs is to control precursor chemicals early in the water treatment process so that smaller quantities of disinfection byproducts form during disinfection. Current alternative strategies include use of non-conventional disinfectants, treatment of the water to reduce formation of DBPs (in the presence of conventional disinfectants), and removal of DBPs after formation. Existing technologies for reducing the concentration of DBPs include the following: (a) adsorption of DBPs or precursors onto granular activated carbon within a fixed bed contactor or adsorption onto powdered activated carbon during various stages of the treatment process; (b) complexing DBPs or precursors with hydrous metallic floc, primarily aluminum and iron hydroxides, in conventional water treatment plants after adjusting the pH of influent water; (c) sieving the relatively-larger organic molecules from water by membrane technologies such as ultrafiltration; and (d) electro-dynamic processes such as electrodialysis.

It is an important object of the present invention to efficiently and very economically remove arsenic, TOCs, and other contaminant metals from drinking water. Procedures described can reduce cost of removing these contaminants by a factor of five to fifteen, particularly as compared to reverse osmosis or nanofiltration. It is a further object of the present invention to provide a method and system for removing arsenic, TOCs, and other contaminant metals which may be introduced into existing water treatment facilities. These and other objects of the invention will be apparent to those skilled in the art from the detailed description of the invention contained herein and from the accompanying drawings.

SUMMARY OF THE INVENTION

The method of the present invention removes trace amounts of certain toxic substances in drinking water, specifically: (1) dissolved, colloidal, and particulate arsenic, selenium, and lead; and (2) naturally-occurring organic compounds (Total Organic Carbon or "TOC") which, when oxidized, form disinfection byproducts; and (3) other potentially harmful minerals.

The invention utilizes a solid medium with a very high surface area finely-divided metallic elemental iron, or "sponge" iron. The medium is manufactured by forming an oxidized surface in water in the presence of finely-divided elemental sulfur or other sulfur-bearing compounds such as manganese sulfide. The solid medium, which may be called "sulfur-modified iron" and is sometimes thus referred to herein, is manufactured by mixing the constituents in water according to predetermined proportions. In one preferred embodiment of the present invention, these proportions may be approximately, by weight: 200 parts iron, 100 parts sulfur, and 1,000 parts water. The mixture is produced in water in a predetermined pH level, which for a preferred embodiment is in a range of pH between about 5.0 and 8.5. The normal process temperatures can range from 34° Fahrenheit to near boiling. This blend is mixed for approximately two hours while the active agent forms. Mixing time depends upon the temperature of the mixture, pH of the water, and the presence of complexing or sequestering minerals and organic acids in the water. Lower temperature, higher pH and presence of such complexing minerals generally will dictate longer mixing time. In one preferred embodiment, an oxidizing agent is added to the mixture after the pH rises and stabilizes, and agitating is continued. In a specific embodiment the oxidizing agent is hydrogen peroxide.

The solid sulfur-modified iron can be removed from the water in which it is manufactured and used to treat water. The treatment can be by batch or flow-through process. The sulfur-modified iron can be removed from the process stream by gravity separation processes, by centrifugal force, or by magnetic separation processes.

In the batch treatment process, untreated water and the components of sulfur-modified iron or pre-formed sulfur-modified iron are mixed vigorously for a variable period of time. The duration of mixing can be for as little as 5 minutes or as long as two hours depending upon the state of completeness of the sulfur-modified iron and the physical constants of the water to be treated. The mixing can be provided by airlift pumps, hydraulic mixing, action of a fluidized bed, mechanical mixers, or by other measures. Note that the batch treatment process can employ a pre-mix of sulfur-modified iron, or the iron and sulfur can be separately mixed into the untreated water. Parameters such as mix time will vary depending on which procedure is used.

In the flow-through process, the preferred process, the sulfur-modified iron is pre-prepared and resides in an upflow, fluidized bed reactor or other fully-mixed reactor vessel for an appropriate period of time. The sulfur-modified iron remains in the reactor by virtue of its relatively high specific gravity, 2.6±, while the untreated water flows past in turbulent mixing. Necessary resident time in the reactor is approximately 5 minutes, depending upon several process variables. Alternately, the process can take place in a pebble flocculator or contact clarifier apparatus in which the sulfur-modified iron is affixed to the surface of the treatment medium within the vessel or recirculated within the reaction zone of the process. Another alternative is to introduce the sulfur-modified iron into the center well of a rapidly mixed contact clarifier in a water or wastewater treatment plant.

It is believed that the sulfur-modified iron will become depleted in its capacity to absorb and absorb toxic substances from water after about 100,000 pore volumes, more or less, have been treated. At that time, it may be replenished by removing the toxic substances. It may be that the sulfur-modified iron can be replenished and reused by washing it with an appropriately selected basic or acidic liquid. The choice of the replenishing fluid will be dictated by the economics of the specific installation in which it is used. The characteristics of the untreated water may permit resource recovery from the regeneration fluids. Removal, regeneration, and replacement can be a continuous flow or periodic batch process.

In practice, the contact vessel used for treatment can be either a mixed container or a gravity filter-like contactor (upflow or downflow) or a fluidized bed contactor. Contact times for effective treatment of a variety of contaminants have varied from as little 3 minutes to as long as 30 minutes.

Use of various gradations and mixtures of sulfur-modified iron (SMI) have been successfully demonstrated to remove the following toxic substances from water: arsenic (arsenite and arsenate); disinfection byproducts and precursors; copper; chrome VI; sulfate; and chlorinated solvents including trichloroethene. Metals removed may be present in the untreated water in either the dissolved state or as a fine particulate. See to the tables below, entitled "Summary of SMI Laboratory Testing" and "Laboratory Development Studies of SMI." In most cases, tests were conducted using fixed bed reactors. In some cases, the beds in these reactors were periodically disturbed by counter-current flow to prevent agglomeration of the media.

SMI has been fabricated using sulfur in the amount of up to 50% of the weight of the iron and as little as 3%. The full effect of sulfur to iron ratio has not been fully explored; however, the SMI mix is effective against a range of contaminants regardless of this ratio. SMI premix has been manufactured using a wetted but non-fluid mix at room temperature and at elevated temperature.

SMI has been successfully demonstrated in pressure and gravity contact beds in both upflow and downflow modes. SMI has been prepared in uniformly-graded media similar in size and gradation to commercially-available filter media.

Spent SMI can be recycled as a non-hazardous material as feed material to a steel production facility. For such use the spent SMI must not contain sufficient toxic material to be classified as hazardous for purposes of transportation of waste materials, and the steel facility must have off-gas scrubbing equipment installed to handle the toxic materials released when spent SMI is incorporated into the metals produced.

DESCRIPTION OF PREFERRED EMBODIMENTS

As specified above, the method of the present invention removed trace amounts of certain toxic substances or precursors to toxic substances in drinking water. This process depends upon the creation or use of a solid medium with a very high surface area produced from finely-divided metallic elemental iron called "sulfur-modified iron" herein, as explained above. The medium is generated by forming an oxidized iron surface in water in the presence of finely-defined elemental sulfur or other sulfur-bearing compounds such as manganese sulfide.

Figure 3:
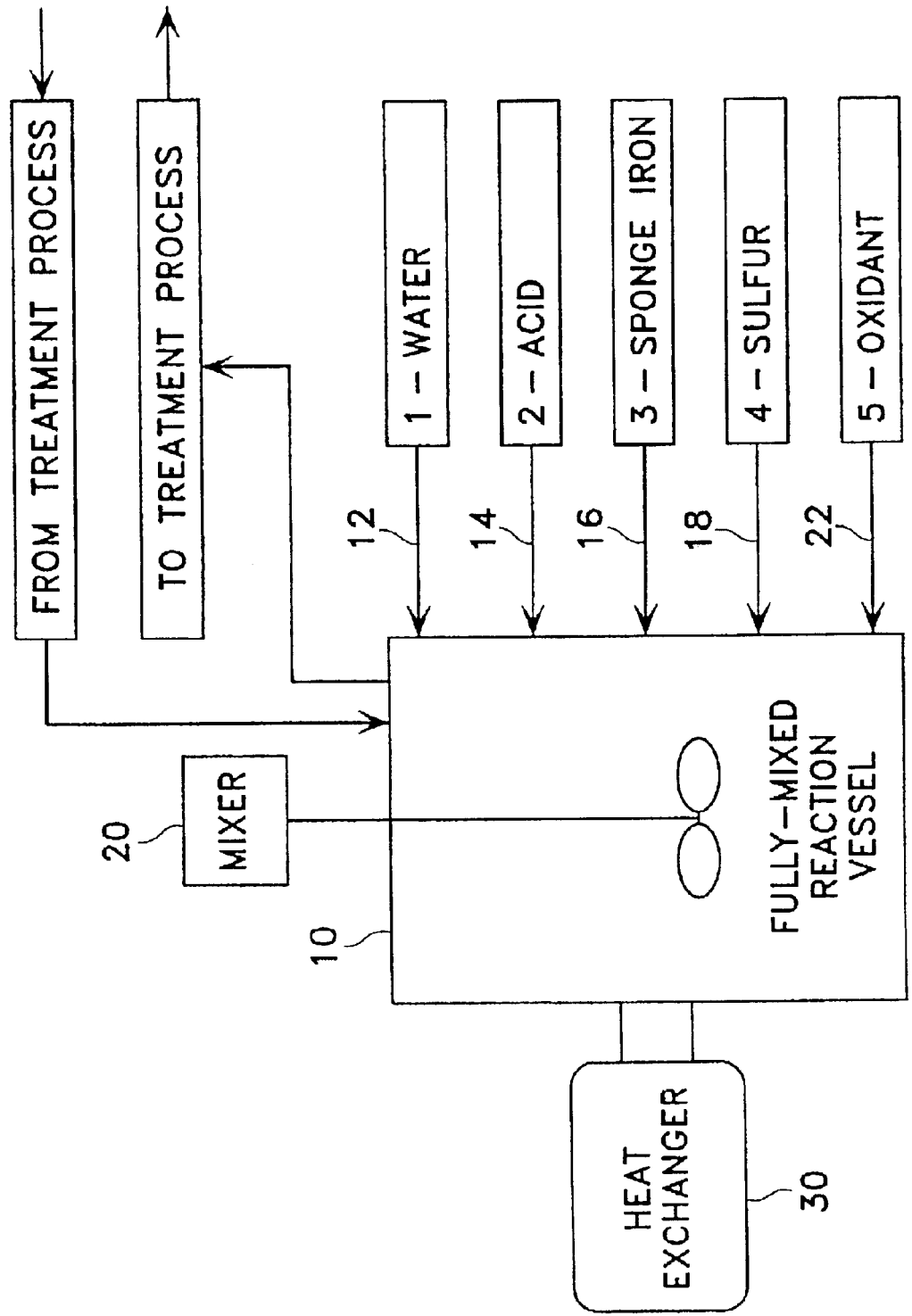
FIG. 3 illustrates a reactor according to an embodiment of the present invention for producing sulfur-modified iron.

Accordingly, FIG. 3 illustrates a preferred method for the creation of sulfur-modified iron. A reaction vessel 10 is filled with water at 12. Next, a fluid is introduced at 14 to bring the mixture to a predetermined pH level, which for one preferred embodiment is in a range of pH between 5.0 and 8.5, more broadly, about 3.5 to about 10. In addition, heat may be introduced or recovered by heat exchanger 30 as appropriate to bring the water into an acceptable temperature range. Normal process temperatures range from 34° F. to near boiling. As noted below, some elevation of temperature above standard (room) temperature has been found effective in facilitating a lesser reaction time.

A modified method is described below following the examples, by which minimal water is used and the exothermic nature of the reaction is used to speed the reaction and substantially to dry the mixture at completion of the reaction.

Sulfur-modified iron may be manufactured by pre-mixing the constituents in water according to predetermined proportions, as explained above. First, "sponge iron" is added at 16 and agitated by a mixer 20 for a period of time, for example one hour in one preferred embodiment. Sponge iron with particle sizes of 325 mesh or slightly larger are preferred. Next, sulfur is added at 18 and the mixture is again agitated by mixer 20, for 45 minutes in the embodiment described immediately above. In addition to elemental sulfur, it is believed that sulfur compounds such as manganese sulfide may be substituted.

In a preferred embodiment of the present invention, in preparing a pre-mix sulfur-modified iron, proportions of the reactants are approximately, by weight: 200 parts iron, 100 parts sulfur, and 1,000 parts water. This blend is mixed while the active agent forms. Mixing time depends upon the temperature of the mixture, pH of the water, and the presence of complexing or sequestering minerals and organic acids in the water, as noted above.

Next, in the preferred embodiment described, an oxidant may be added at 22, after the pH of the sulfur-iron-water suspension stabilizes. In the preferred embodiment discussed above, one part of hydrogen peroxide is introduced and the mixture is agitated by the mixer 20 for about 15 minutes.

Finally, the resulting solid sulfur-modified iron can be largely removed from the water in which it is manufactured, and can be used to treat water.

The preferred usage of sulfur-modified iron is in a flow-through process in the water treatment system as described above. In this flow-through process, the sulfur-modified iron is pre-prepared and resides in an upflow reactor or other fully-mixed reactor vessel. As described above, in this system the sulfur-modified iron is retained in the reactor by gravity while at the same time fully-mixed contact takes place as the water flows upward. The resulting mixture of toxic substances and sulfur-modified iron is separated and removed from the cleaned water by gravity, centrifugal force, or magnetic separation. The sulfur-modified iron may be recycled by regeneration, using an appropriate acidic or basic rinse solution.

Figure 2:
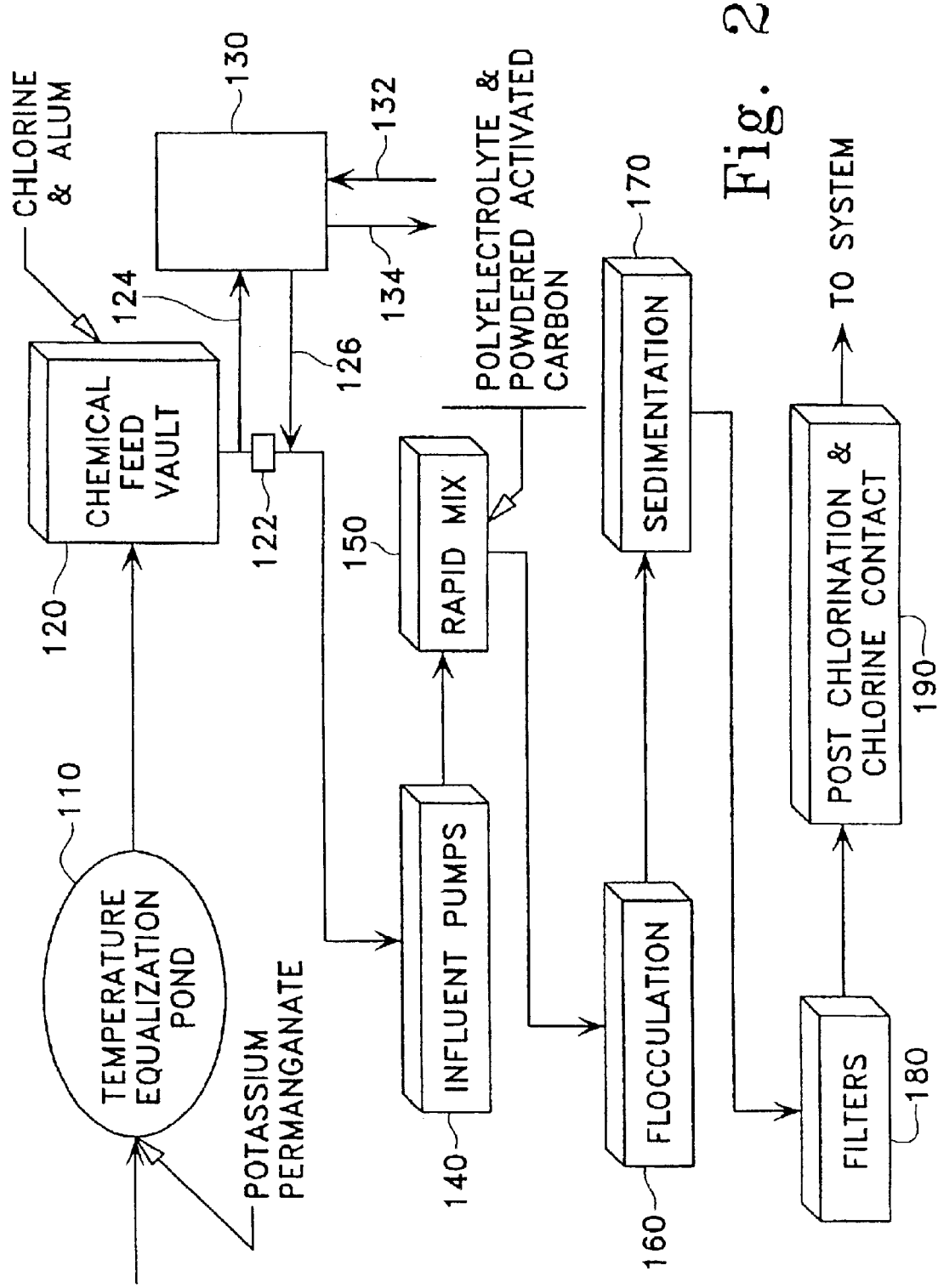
FIG. 2 is a schematic flow chart of a prior-art water treatment process/plan indicating the addition of a flow-through treatment reactor according to the present invention. In each of FIGS. 1 and 2 the contact vessel can be understood to be either a mixed container or a gravity filter-like contactor (upflow or downflow) or a fluidized bed contactor. Further, mixing in a fully-mixed reactor is unnecessary to obtain full benefit of the SMI treatment for removal of contaminants.

Such a reactor may be introduced into an existing water treatment plant as shown in FIG. 2. First, a valve 122 is inserted between chemical feed vault 120 and influent pumps 140. New piping 124 and 126 are introduced to convey water into and out of, respectively, the new reactor 130. Sulfur-modified iron can be introduced from infeed 132 and removed by outfeed 134.

The sulfur-modified iron will ordinarily remain in the reactor 130 by virtue of its relatively high specific gravity, 2.6±, while the untreated water flows past in turbulent mixing. Necessary residence time in the reactor 130 is approximately 5 minutes, depending upon several process variables.

Alternately, the process can take place in a pebble flocculator or contact clarifier apparatus in which the sulfur-modified iron is affixed to the surface of the treatment medium within the vessel or recirculated within the reaction zone of the process. Another alternative is to introduce the sulfur-modified iron into the center well of a rapidly mixed contact clarifier in a water or wastewater treatment plant.

The sulfur-modified iron will become depleted in its capacity to adsorb and absorb toxic substances from water after a number of pore volumes (believed to be about 100,000 pore volumes) have been treated. At that time, as discussed above, it can be replenished by removing the toxic substances. It is believed that the sulfur-modified iron can be replenished and reused by washing it with selected acidic or basic liquids, such as a caustic soda, to pull the organic compounds off the surface of the iron. The choice of the replenishing fluid will be dictated by the economics of the specific installation in which it is used. The characteristics of the untreated water may permit resource recovery from the regeneration fluids. Removal, regeneration, and replacement can be a continuous flow or periodic batch process.

Figure 1:
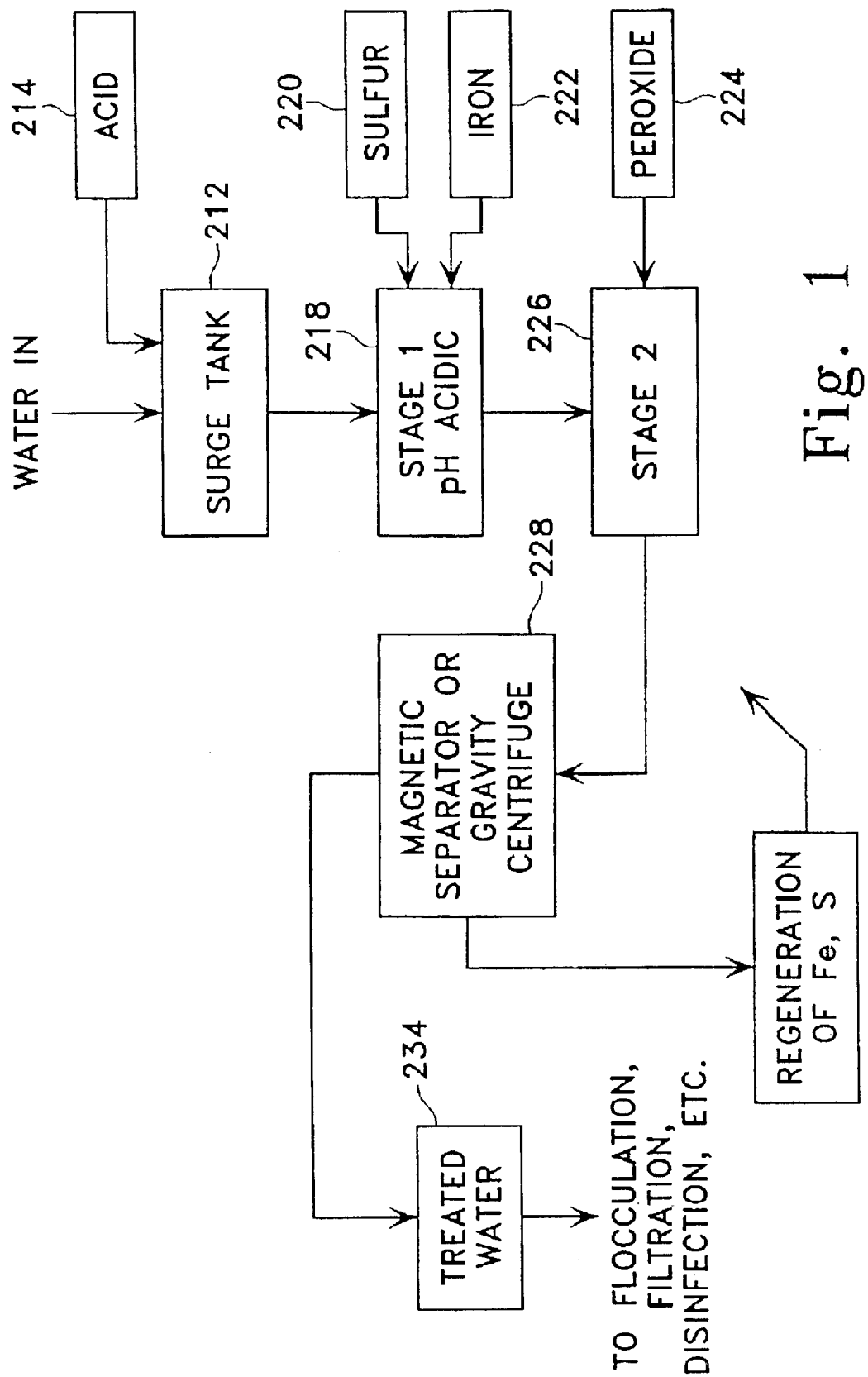
FIG. 1 is a schematic flow chart of the use of a preparation of sulfur-modified iron according to a batch process.

An alternative method of producing sulfur-modified iron and of treating the influent water in the same process is illustrated in FIG. 1. In this batch treatment process, untreated water and either iron and sulfur or pre-formed sulfur-modified iron are mixed vigorously for a variable period of time. The duration of mixing can be for as little as 5 minutes or as long as two hours depending upon the state of completeness of the formation of the sulfur-modified iron and the physical constants of the water to be treated, including temperature and pH. The mixing can be provided by airlift pumps, mechanical mixers, or by other measures.

Water enters and is stored in a surge tank at 212, and a fluid is introduced at 214 to bring the mixture to a predetermined pH level, which for the preferred embodiment is in a range in pH between 3.5 and 8.5. An acid pH range generally causes the process to work more efficiently. However, economic considerations dictate that acidification should be avoided if practicable. Drinking water often is in a range of pH 7.5 to 9.5 (to avoid corrosion of pipes). An efficient range of pH is 5.0 to 8.5, but slightly higher pH can be acceptable, depending on content of the water. In addition, heat may be introduced as appropriate to bring the water into an acceptable range. The normal process temperatures range from 34° F. to near boiling, but temperatures above room temperature tend to produce faster reaction time. Of course, it is more economical not to heat the water if this can be avoided within practical time constraints.

Next, at first stage 218, sponge iron at 222 is added and agitated by a mixer. Either sponge iron or partially prepared sulfur-modified iron may be used. Next, if iron alone has been added, sulfur is added at 220 and the mixture is again agitated for an additional period of time. As mentioned above, it is believed that sulfur compounds such as manganese sulfide may be substituted.

Next, an oxidant at 224 is added at to the mixture at the second stage 226, after the pH of the sulfur-iron-water suspension stabilizes. Again, in the preferred embodiment discussed above, one part of hydrogen peroxide is introduced (relative to 200 parts iron and 100 parts sulfur by weight) and the mixture is agitated.

Finally, the reacted solid sulfur-modified iron can be removed from the water by magnetic separation, gravity or centrifuge, as indicated at 228. The treated water 234 may then be subjected to further treatment as conventional.

In addition to the form described above, the sulfur-modified iron may be affixed to a substrate solid material such as silica, alumina, ceramic, or other materials. This approach has the disadvantage that the use of the substrate diminishes the effectiveness of the sulfur-modified iron by diminishing its surface area, and the advantage of being easier to suspend in the water than particulate iron. Another potential advantage is in allowing a combination with other catalysts. There are application techniques wherein the less-mobile substrate (less easily suspended) is more practical and desirable, such as in a point-of-use water filter.

Water treatment science has examined many of the reactions associated with removal of toxic substances from water including (a) chemical and biological oxidation and reduction phenomenon; (b) formation of metallic and non-metallic hydroxides or oxyhydroxides in conventional water treatment processes; (c) chemical precipitation processes; (d) molecular sieve process such as reverse osmosis and ultra-filtration; and (e) electromotive-force process such as electrodialysis. The family of sulfur-modified iron processes developed according to the invention and described herein has not been described at the atomic level by water treatment researchers, nor have the process performance characteristics been defined independently of the work performed pursuant to this invention. Perhaps the closest related processes are the Fenton-Reagent Process and the ferric sulfide coagulation processes which do not use solid, particulate chemicals, but use liquid.

Recent experiments in corrosion science have produced photographs with atomic-level resolution of the formation of rust on iron particles in water. This work, reported by Roger C. Newman in "Science", vol.263, 1708 & 1709, states "the passive oxide film on iron is none of the known hydroxides or oxyhydroxides". He further reports that "the iron in the film is surrounded by six oxygen atoms in a distorted octahedral arrangement, and that these octahedra share edges and faces, perhaps forming sheets or chains". It is believed, according to this invention, that the oxide film that forms on the porous, elemental iron in the presence of sulfur causes one or more of the oxygen atoms to be replaced with sulfur, causing the formation of the unique surface-active treatment agent: sulfur-modified iron. The use of this solid, particulate material rather than liquid reagents provides for more economical and effective contaminant removal than processes used previously.

By the processes described herein, treatment with sulfur-modified iron has removed precursors of DBPs, analyzed as Total Organic Carbon, from natural water sources to a concentration of 4 mg/L or less. Total Organic Carbon concentration in the untreated water of test samples varied from 6 to 20 mg/L. In the case of paper mill acid ditch effluent, COD was reduced from 3080 to 2100 with only 15 minutes reaction time.

Sulfur-modified iron also has consistently removed arsenic from natural water sources to less than 5 $\mu$g/L (the practical quantitative limit of test equipment used for analyses.) Arsenic concentration in the untreated water varied from 34 to 170 $\mu$g/L.

Several examples of the results of the procedure on arsenic removal are presented in Examples 1 through 4, 6 and 10 below. Examples demonstrating the results of the procedure on TOC removal are presented in Examples 5 through 9 and 11 below.

In the examples reported below, the quantity of particulate iron employed, as compared to the amount by weight of arsenic contaminating the water, often is in a ratio of about 1000:1, sometimes less, sometimes greater. The amounts of powdered iron ranged in most cases from about 0.15 gram to 0.5 gram. However, it is believed that the amount of iron could be reduced down to about 0.01 g/L, or even 0.005 g/L, for effective removal of most of the contaminating arsenic in the sample quantities disclosed. The amount of sulfur is generally maintained at about one-half by weight the amount of iron, which it is believed will hold true with the smaller quantities of iron projected above.

The examples set forth below have all employed granular, powdered iron or "sponge iron", and from the experience of testing it is believed that an effective range of iron particle sizes about −20 to about −400 mesh. However, iron in any particle size will have some efficacy, in combination with the steps and other reagents described, in removing arsenic, TOC and AOX from water. One procedure for removing these contaminants, not described in the examples below, is to form a bed of sulfur-modified iron particles, but with a larger particle size, up to about ¼ inch. This bed, arranged in the manner of a granular filter bed or contact bed, provides a stable medium through which the contaminated water is directed, by gravity or pumping. This arrangement can serve efficiently in a water treatment system.

EXAMPLE 1

Arsenic in Well Water

A sample was obtained from the Kern County Water Agency as a part of the normal sampling run of the wells in the Kern Water Bank. The well is owned by the California Department of Water Resources. This well, designated 32N2, has naturally-occurring arsenic. The sample was stored at approximately 34° F. In the water sampled during this run, the arsenic concentration was 170 $\mu$g/L. Other than the elevated concentration of arsenic, this well water is typical of well water used throughout the California Central Valley for domestic water service.

This sample was treated for removal of arsenic by batch treatment by the method and system of this invention. Starting temperature of the 1,000 mL sample was 60° F. and pH was 8.8. The sample was acidified to pH 4.3 with 3 mL, 1N sulfuric acid. To the acidified water sample was added 0.3 grams of finely-divided sponge iron and 0.1 gram of finely divided elemental sulfur (no pre-mix of sulfur-modified iron was prepared). The previously-clear mixture turned cloudy. After approximately 1 hour and 20 minutes, one drop of hydrogen peroxide was added to the mixture; pH was 6.1 before the $H_2O_2$ and 5.5 after. The mixture was stirred rapidly for total time of 1 hour and 53 minutes after adding the iron at which time a sample of the decanted mixture was sent to a certified water quality laboratory for analysis for arsenic. Arsenic concentration reported was less than the practical quantitation limit of 5 $\mu$g/L.

EXAMPLE 1

Mar. 28, 1994

| TIME (min) | ACTIVITY | pH | TEMP ° F. | LAB NOTES | As (µg/L) |
|---|---|---|---|---|---|
| −30 | Refrigerated Kern Water Bank well water in unopened 1 L sample bottle. Well 32N2 | 8.8 | 34 | Clear, stirring slowly | 170 |
| −15 | Add 3 mL 1 N $H_2SO_4$ | 4.3 | 60 | Clear, stirring slowly | |
| −10 | Add 0.3 g Fe, Grade B | 4.1 | | Clear, stirring slowly | |
| 0 | Add 0.1 g S, dry, powdered | | | Cloudy, stirring slowly | |
| 0 | Increase stirring to rapid | | | Cloudy, rapid | |
| +20 | | 6.1 | | Cloudy, rapid | |
| +20 | Add 1 drop 3% $H_2O_2$ | 5.5 | | Cloudy, rapid | |
| +112 | Decant and sample. Laboratory filter. | 6.4 | | Cloudy (before filtration) | ND |

ND = Not detected. Practical Quantitation Limit = 5 µg/L.

EXAMPLE 2

Arsenic in Well Water

Example 2 uses the same sample water source and treatment dynamics as Example 1 and is a confirmation of the methods of Example 1. The reagent quantities and procedures varied lightly.

EXAMPLE 2

Apr. 4, 1994

| TIME (min) | ACTIVITY | pH | TEMP ° F. | LAB NOTES | As (µg/L) |
|---|---|---|---|---|---|
| −30 | Refrigerated Kern Water Bank well water in unopened 1 L sample bottle. Well 32N2 | 9.3 | 34 | Clear, stirring rapidly | 170 |
| −10 | Add 3 mL 1N $H_2SO_4$ | 3.5 | 60 | Clear, stirring rapidly | |
| −5 | Add 0.2 g Fe, MH-100 (slightly coarser than Grade B) | 3.4 | | Clear, stirring rapidly | |
| 0 | Add 0.1 g S, dry, powdered | 3.4 | | Cloudy, stirring slowly | |
| +15 | | 5.6 | | Cloudy, rapid stirring | |
| +15 | Add 1 drop 3% $H_2O_2$ | 4.5 | | Cloudy, rapid | |
| +161 | Decant, filter, & sample. | 5.8 | | Cloudy (reddish) | ND |

EXAMPLE 3

Arsenic in Well Water

Example 3 uses the same sample water source and treatment dynamics as Examples 1 and 2. It is a confirmation of the methods of Examples 1 and 2, with slightly different reagent quantities and procedures, including acid and iron quantities. Note that initial pH in Examples 1-3 is 8.8 to 9.3, with essentially complete arsenic removal.

EXAMPLE 3

Apr. 13, 1994

| TIME (min) | ACTIVITY | pH | TEMP °F. | LAB NOTES | As (μg/L) |
|---|---|---|---|---|---|
| −30 | Refrigerated Kern Water Bank well water in unopened 1 L sample bottle. Well 32N2 | 9.0 | 34 | Clear, stirring rapidly | 170 |
| −10 | Add 1.5 mL 1N $H_2SO_4$ | 6.4 | 60 | Clear, stirring rapidly | |
| 0 | Add 0.15 g Fe, MH-100 | 6.0 | | Clear, stirring rapidly | |
| 0 | Add 0.1 g S, dry, powdered | 6.0 | | Cloudy, stirring slowly | |
| +25 | | 6.1 | | Cloudy, rapid | |
| +15 | Add 1 drop 3% $H_2O_2$ | 5.7 | | Cloudy, rapid | |
| +170 | Decant, filter, & sample. | 7.8 | | Cloudy | ND |

EXAMPLE 4

Arsenic in Well Water

Example 4 uses the same sample water source and treatment dynamics as Examples 1, 2, and 3, except that sulfur is not added (except as present in sulfuric acid). It is a confirmation of the methods of the previous examples, but indicating that arsenic removal is not as complete without addition of sulfur.

EXAMPLE 4

Apr. 17, 1994

| TIME (min) | ACTIVITY | pH | TEMP °F. | LAB NOTES | As (μg/L) |
|---|---|---|---|---|---|
| −30 | Refrigerated Kern Water Bank well water in unopened 1 L sample bottle. Well 32N2 | 9.4 | 34 | Clear, stirring rapidly (until decant) | 170 |
| −10 | Add 3 ml 1N $H_2SO_4$ | 3.5 | 60 | | |
| 0 | Add 0.2 g Fe, MH-100 | 3.0 | | | |
| +15 | Add 1 drop 3% $H_2O_2$ | 3.5 | | | |
| +185 | Decant, filter, & sample | 5.3 | | | 6 |

EXAMPLE 5

TOC in Surface Water

A water sample, 2½ gallons, was taken from Rock Slough Bridge (Br.#RSB5/28), Contra Costa County, Calif. at the same point that Contra Costa County Water District (California) samples its source water for its water treatment plant. The sampling time was coordinated with the District sample run. The purpose of this test and sample is to demonstrate removal of total organic carbon from surface water.

The treatment is essentially the same as described in Example 1. The major difference is that the treated water was rich in natural organic chemicals which tend to bind the iron and reduce its treatment effectiveness. It should be kept in mind that the TOC content in samples will decrease somewhat with time following taking of the sample, without any treatment, because some of the content of TOC is volatile.

EXAMPLE 5

Apr. 28, 1994

EXAMPLE 5

28 APR. 1994

| TIME (min) | ACTIVITY | pH | TEMP °F. | LAB NOTES | TOC mg/L |
|---|---|---|---|---|---|
| −30 | 800 mL refrigerated Rock Slough water blended with 200 mL Kern Water Bank well water | 8.1 | 34 | Blend, stirring rapidly | 5 |
| −10 | Add 2.5 mL 1N $H_2SO_4$ | 5.5 | 60 | Blend, stirring rapidly | |
| −5 | Add 0.2 g Fe, Grade B | 5.5 | | Blend, stirring rapidly | |
| 0 | Add 0.1 g S, dry, powdered | 5.5 | | | |
| +15 | | 5.9 | | | |

EXAMPLE 5-continued

28 APR. 1994

| TIME (min) | ACTIVITY | pH | TEMP °F. | LAB NOTES | TOC mg/L |
|---|---|---|---|---|---|
| +15 | Add 2 drops 3% $H_2O_2$ | 5.6 | | Continued rapid stirring | |
| +50 | 30 mL sample filtered with Whatman 42 | | | | 4 |

EXAMPLE 6

TOC & Arsenic in Surface Water

This example used the same sample as Example 5, but "spiked" with arsenic by mixing 800 mL of surface water with 200 mL of the water from the Kern Water Bank well 32N2, described in Example 1.

EXAMPLE 6

Apr. 29, 1994

| TIME (min) | ACTIVITY | pH | TEMP °F. | LAB NOTES | TOC mg/L | As µg/L |
|---|---|---|---|---|---|---|
| −20 | 800 mL refrigerated Rock Slough water blended with 200 mL Kern Water Bank well water | 8.2 | 34 | Blend, rapid stirring | 7.0 | 34 |
| −5 | Add 2 mL 1N $H_2SO_4$ | 4.8 | | | | |
| 0 | Add 0.2 g Fe, Grade B | | | | | |
| 0 | Add 0.1 g S, dry, powdered | 4.6 | | | | |
| +18 | | 5.5 | | | | |
| +18 | Add 3 drops 3% $H_2O_2$ | 5.0 | | | | |
| +80 | 100 mL sample filtered with Whatman 42 | | | Continued rapid stirring until filtration | 5.0 | |
| +80 | 50 mL sample, unfiltered | | | | | 26 |

EXAMPLE 7

TOC in Surface Water

The same Rock Slough surface water, a source of drinking water before treatment, was treated alone, without addition of arsenic-containing water. Tests were conducted using the method of the invention, in order to reduce the concentration of TOC in the water.

EXAMPLE 7

May 7, 1994

| TIME (min) | ACTIVITY | pH | TEMP °F. | LAB NOTES | TOC mg/L |
|---|---|---|---|---|---|
| −20 | 1,000 mL refrigerated Rock Slough water | 8.1 | 34 | Clear | 7.0 |
| −5 | Add 2 mL 1N $H_2SO_4$ | 4.8 | | | |
| 0 | Add 0.2 g Fe, Grade B | | | | |
| 0 | Add 0.1 g S, dry, powdered | 4.6 | | | |
| +18 | | 5.5 | | | |
| +18 | Add 3 drops 3% $H_2O_2$ | 5.0 | | | |
| +80 | 100 mL sample filtered with Whatman 42 | | | Continued rapid stirring until filtration | 5.0 |
| +80 | 50 mL sample, unfiltered | | | | |

EXAMPLE 8

TOC in Surface Water

The surface water sample was taken from the same point on Rock Slough as the previous examples three hours before this test. A shorter test period was used to develop data on the maturation of the active agent. This experiment was conducted to determine the influence of pH adjustment on the effectiveness of the active agent. The process appeared to remain effective at a higher pH, all other variables remaining the same, except the oxidizing agent, which was sodium hypochlorite in this test. This test also shows that the process works in the presence of alum, which is often used in municipal treatment plants.

EXAMPLE 8

May 10, 1994

| TIME (min) | ACTIVITY | pH | TEMP °F. | LAB NOTES | TOC mg/L |
|---|---|---|---|---|---|
| −180 | 1,000 mL Rock Slough water | 8.2 | | | 4.0 |

-continued

| TIME (min) | ACTIVITY | pH | TEMP °F. | LAB NOTES | TOC mg/L |
|---|---|---|---|---|---|
| 0 | Add 0.2 g Fe, Grade B | | | Rapid stirring | |
| 0 | Add 0.1 g S, dry, powdered | 7.6 | | Rapid stirring | |
| +10 | Add 9 drops 5.35% sodium hypochlorite solution | 8.1 | | Rapid stirring | |
| +15 | Add 3 drops 50% aluminum sulfate solution | 8.3 | | Slow stirring | |
| +18 | | 7.3 | | Slow stirring | |
| +30 | 100 mL sample, filtered with Whatman 934-AH | 7.1 | | | 3.0 |

EXAMPLE 9

TOC in Surface Water

The surface water sample was taken from the same point on Rock Slough as the previous examples one hour and 40 minutes before this test. This sample was taken to investigate the performance of the active agent during severe deteriorations in water quality.

EXAMPLE 9

Jun. 1, 1994

| TIME (min) | ACTIVITY | pH | TEMP °F. | LAB NOTES | TOC mg/L |
|---|---|---|---|---|---|
| −115 | 1,000 mL Rock Slough water | 3.8 | | | 12 |
| −5 | Add 5 mL 1N $H_2SO_4$ | 3.4 | 60 | Rapid stirring | |
| 0 | Add 0.3 g Fe, Grade B | | 60 | Rapid stirring | |
| 0 | Add 0.2 g S, dry, powdered | | 60 | Rapid stirring | |
| +25 | Add 4 drops 3% $H_2O_2$ | 6.1 | 60 | Rapid stirring | |
| +135 | 100 mL sample filtered with Whatman 934-AH | 6.2 | 60 | No stirring | 6.0 |
| +175 | 100 mL sample, filtered with Whatman 934-AH | 7.3 | | Clear supernate. Gas evolving from sludge. | 5.0 |

EXAMPLE 10

Arsenic in Well Water, Treated with Sulfur-modified Iron Pre-mix

In this example, a pre-mix was prepared of reagents in distilled water, prior to introduction into the well water to be treated for arsenic. This shows that reaction can be achieved in the pre-mix, sufficient to form a reactive, concentrated reagent mix for addition directly to the water to be treated, without need for direct application of the individual non-reacted reagents (iron, sulfur, oxidizing agent) to the well water. The advantage is that a much smaller reaction vessel and much less mixing energy is used to achieve treatment as compared with not using premix.

To one liter of distilled water, powdered iron (sponge iron), elemental sulfur and a 3% hydrogen peroxide solution were added. The quantities were as follows: Grade B iron, 0.5 g; elemental sulfur, 0.2 g; hydrogen peroxide, 0.5 mL. No acid was included. These reagents were stirred in the one liter of water for one hour. After stirring, 980 mL of water were decanted off the settled mixture, leaving 20 mL of concentrated reagent mix, i.e., sulfur-modified iron. The concentrated reagent was then added to one liter of Kern County well water having an arsenic content of 40 μg/L. The procedure is shown in the following table:

EXAMPLE 10

Sep. 10, 1994

| TIME (min) | ACTIVITY | pH | TEMP °F. | LAB NOTES | As μg/L |
|---|---|---|---|---|---|
| | 1 L Kern County well water, 15C1 | 7.3 | 60 | | 40 |
| 0 | Add 20 mL sulfur-modified iron pre-mix | | 60 | Rapid stirring (continuous) | |
| +10 | | | | 50% removal | 20 |
| +20 | | | | 60% removal residue brown (continuous) | 16 |

This example shows that an effective mix can be prepared and will accomplish the removal of arsenic from drinking water in substantially the same manner as with the above examples which involved separate addition of each of the individual reagents. The example also demonstrates that a great deal of arsenic removal is accomplished, using the pre-mix as above, in a very early phase of the process. Over 50% removal was effected in the first ten minutes; 60% in the first twenty minutes. It is projected that removal would be complete to the point of less than 5 μg remaining, if the reaction were taken to approximately 45 minutes. Also, it is believed the reaction would be accelerated if the peroxide were added to the entire batch of well water, at a time subsequent to the addition of iron and sulfur. It is also believed that the process could be accelerated if acid were added to reduce the pH to an acid range.

EXAMPLE 11

Removal of TOC (AOX) from Paper Mill Acid Ditch Liquor

In this test, procedures similar to the above were applied to effluent "acid ditch" liquor of a James River Corporation paper mill. Example 11 involved preparation of a premix of iron, sulfur and peroxide in distilled water, with the premix then being introduced to the acid ditch sample. The premix was prepared using a laboratory chemical mixer. Table 11 below reports the results of Example 11, with various components of the acid ditch liquor quantified both before and after treatment by the process of Example 11.

EXAMPLE 11

Jul. 31, 1994

| TIME (min) | ACTIVITY | pH | TEMP °F. | LAB NOTES | COD mg/L | AOX mg/L |
|---|---|---|---|---|---|---|
| −90 | 1,000 mL distilled water, for premix | 7.0 | 60 | | | |
| −85 | Add 0.4 g Fe, Grade B | | 60 | Rapid stirring | | |
| −85 | Add 0.2 g S, powdered | | | Rapid stirring | | |
| −70 | Add 6 drops 3% $H_2O_2$ | | 60 | Rapid stirring | | |
| −15 | Decant off 950 mL $H_2O$, leaving 50 mL premix | | 60 | | | |
| 0 | 1 L James River liquor. Add premix of sulfur-modified iron | | 60 | Rapid stirring | 3080 | 80.0 |
| +15 | 100 mL sample, filtered with Whatman 934-AH | | 60 | | 2100 | 58.9 |

TABLE 11

| Analyte | Acid Ditch - Untreated | Acid Ditch - Treated |
|---|---|---|
| $BOD_6$ (ppm) | 561 | 403 |
| COD (ppm) | 3080 | 2100 |
| pH | 6.1 | 5.1 |
| TSS (ppm) | 403 | 25 |
| Color (NCASI color, units) | 3170 | 4240 |
| Chlorinated Phenolics (ppb): | | |
| 2,4,5 Trichlorophenol | ND(2.5) | ND |
| 2,3,6 Trichlorophenol | 69 | 57 |
| 2,3,4,6 Tetrachlorophenol | ND(2.5) | ND |
| Pentachlorophenol | ND(5) | ND |
| 3,4,5 Trichloroguaiacol | 24 | ND |
| 3,4,6 Trichloroguaiacol | 7.3 | ND |
| 4,5,6 Trichloroguaiacol | 18 | ND |
| Tetrachloroguaiacol | 8.8 | ND |
| 3,4,5 Trichlorocatechol | 110 | 88 |
| 3,4,6 Trichlorocatechol | ND(5) | ND |
| Tetrachlorocatechol | 15 | ND |
| Trichlorosyringol | ND(2.5) | ND |
| AOX (ppb) | 80,000 | 58,900 |

As noted, the results reported in table 11 were taken from sample JR2.2, after only 15 minutes of reaction time of the sulfur modified iron premix with the James River acid ditch liquor sample. Table 11 shows dramatic results for this short reaction time. COD alone was reduced from 3080 mg per liter to 2100 mg per liter. AOX (purgeable organic halides), was reduced from 80,000 to 58,900 μ/L. The trend of the above examples, and additional experience with the method of the invention, have indicated that improved results will be obtained if the oxidizing agent, e.g. hydrogen peroxide, is added later in the reaction, i.e. not as part of the prepared premix but after a certain reaction time of the iron and sulfur with the liquor.

The disclosed method and system remove a range of toxic substances economically and effectively in either large, municipal-sized drinking water treatment plants or smaller single-home or industrial units. The method and system can be applied as a stand-alone treatment or in conjunction with other processes. The original source of the untreated domestic water or wastewater can be ground water, surface water or certain industrial effluents.

EXAMPLE 12

Arsenic in Mining Water

A 55-gallon drum of water containing approximately 1 mg/L of arsenic was obtained from the Wharf Mine, a gold mine in Lead, S.Dak. It was determined that the arsenic was present as $As^{5+}$ (arsenate), so an oxidizing agent was not added in the experiment. The purpose of this experiment was to determine the removal efficiencies of arsenic with respect to iron addition over a 22-hour period, and therefore to determine an adsorption isotherm at pH 8. Grade B iron and elemental sulfur were added at a 2:1 Fe:S ratio with no pre-wetting of iron or sulfur. The Fe:As ratios were 633:1, 316:1, 158:1, 79:1 and 40:1.

Adsorption isotherms generated from bench-scale tests predict the amount of contaminant removed (in this case, arsenic) for a given amount of adsorbate (in this case, iron and sulfur). Adsorption isotherm tests are "static" tests in that water does not continuously flow over the adsorbate. The removal rate predicted from an isotherm is the theoretical maximum amount adsorbed at equilibrium conditions, although better results are occasionally obtained in continuous-flow conditions.

Five jars in a mixing unit were filled with two liters each of contaminated water with an initial pH of 8.87. Each jar was acidified to pH 8 with several drops of 12 N HCl. Varying quantities of Grade B iron and elemental sulfur were added to each jar to obtain the aforementioned ratios. The jars were stirred rapidly in a mixing unit at 300 rpm. After 22 hours, the water from each jar was filtered into 250-ml sample bottles and sent to a certified water quality laboratory for analysis of dissolved arsenic.

EXAMPLE 12

Dec. 22, 1997

| TIME (min) | ACTIVITY | pH | TEMP (° F.) | LAB NOTES | As (mg/L) |
|---|---|---|---|---|---|
| −25 | Add 2 L of Wharf water to 5 jars. | 8.87 | 68 | Yellow tinged water | 0.632 |
| −15 | Add several drops 12 N HCl to each jar. | 8.00 | | | |
| 0 | Increase speed of mixing unit to 300 rpm. | | | | |
| 0 | First jar: add 0.8 g Fe, Grade B, dry and 0.4 g S, dry, powdered. | 8.24 | | Yellow tinged water | |
| 0 | Second jar: add 0.4 g Fe, Grade B, dry and 0.2 g S, dry, powdered. | 8.22 | | Yellow tinged water | |
| 0 | Third jar: add 0.2 g Fe, Grade B, dry and 0.1 g S, dry, powdered. | 8.19 | | Yellow tinged water | |
| 0 | Fourth jar: add 0.1 g Fe, Grade B, dry and 0.05 g S, dry, powdered. | 8.20 | | Yellow tinged water | |
| 0 | Fifth jar: add 0.05 g Fe, Grade B, dry and 0.025 g S, dry, powdered. | 8.16 | | Yellow tinged water | |
| 10 | Add several drops 12 N HCl to each jar. | 8.00 | | | |
| 1320 | Filter samples from each jar. | 8.60 | | Yellow tinged water | |

| JAR | Fe:As RATIO | DISSOLVED ARSENIC CONCENTRATION (mg/L) |
|---|---|---|
| 1 | 633:1 | ND |
| 2 | 316:1 | ND |
| 3 | 158:1 | 0.005 |
| 4 | 79:1 | 0.028 |
| 5 | 40:1 | 0.060 |

The results demonstrate that in all five sub-examples, there is removal of the arsenic from the water. While low ratios of iron to arsenic appear to be less effective than with higher ratios, arsenic levels are still substantially reduced. For example, in the case of a 40:1 ratio of iron to arsenic, the arsenic level in the water was reduced from approximately 1 mg/L to 0.060 mg/L. The examples show that removal is still very effective at less than 100:1 iron to arsenic.

Furthermore, this example demonstrates that in the case where arsenate is present, the effective results may be obtained without introduction of an oxidizing step.

EXAMPLE 13

Arsenic in Mining Water

Example 13 used the same sample water source and treatment dynamics as Example 12 except the sample water was acidified to pH 7 with 12 N HCl and the Fe:As ratios were adjusted to 225:1, 170:1, 112:1, 56:1, 28:1 and 11:1. The Grade B iron and elemental sulfur were not pre-wetted, and an oxidizing agent was not added. The initial arsenic concentration was lower than in Example 12 because some of the arsenic had precipitated while being stored in the drum. The pH in each jar increased from 7.0 to approximately 7.9 during the experiment.

EXAMPLE 13

Jan. 20, 1998

| TIME (min) | ACTIVITY | pH | TEMP (° F.) | LAB NOTES | As (mg/L) |
|---|---|---|---|---|---|
| −25 | Add 2 L of Wharf water to 5 jars. | 9.02 | 68 | Yellow tinged water | 0.112 |
| −15 | Add several drops 12 N HCl to each jar. | 7.00 | | | |
| 0 | Increase speed of mixing unit to 300 rpm. | | | | |
| 0 | First jar: add 0.05 g Fe, Grade B, dry and 0.025 g S, dry, powdered. | 7.92 | | Yellow tinged water | |
| 0 | Second jar: add 0.038 g Fe, Grade B, dry and 0.019 g S, dry, powdered. | 7.91 | | Yellow tinged water | |
| 0 | Third jar: add 0.025 g Fe, Grade B, dry and 0.0126 g S, dry, powdered. | 7.85 | | Yellow tinged water | |
| 0 | Fourth jar: add 0.0126 g Fe, Grade B, dry and 0.0063 g S, dry, powdered. | 7.92 | | Yellow tinged water | |

| | | | | |
|---|---|---|---|---|
| 0 | Fifth jar: add 0.0063 g Fe, Grade B, dry and 0.0032 g S, dry, powdered. | 7.90 | Yellow tinged water | |
| 0 | Sixth jar: add 0.0025 g Fe, Grade B, dry and 0.0013 g S, dry, powdered. | 7.89 | Yellow tinged water | |
| 10 | Add several drops 12 N HCl to each jar. | 7.00 | | |
| 1320 | Filter samples from each jar. | 7.50 | Yellow tinged water, Fe oxidizing | |

| JAR | Fe:As RATIO | DISSOLVED ARSENIC CONCENTRATION (mg/L) |
|---|---|---|
| 1 | 225:1 | ND |
| 2 | 170:1 | ND |
| 3 | 112:1 | 0.008 |
| 4 | 56:1 | 0.012 |
| 5 | 28:1 | 0.010 |
| 6 | 11:1 | 0.050 |

As in Example 12, this example demonstrates the effectiveness of the process with lower iron to arsenic ratios, i.e., those where the ratio is less than about 100:1. In this case the initial arsenic level was lower, and even at ratios as low as 11:1 the resulting arsenic concentration was only 0.050 mg/L. The subexamples of this example also show increased arsenic removal effectiveness when pH is adjusted to about 7.0 rather than 8.0 as in Example 12.

Also as in Example 12, this example demonstrates achieving effective results without introduction of an ionizing step.

EXAMPLE 14

Arsenic in Mining Water

Example 14 used the same sample water source as Example 12 with a different treatment method. The sample was treated for removal of arsenic in a 3×3 designed experiment with three different residence times and three different iron-to-sulfur ratios, including one without sulfur. There were also three quality control duplications, for a total of 12 tests. The experiment was performed in two sets using six mixing jars in each set. A newer batch of Grade B iron was used for this experiment and was added at a 200:1 weight ratio of iron-to-arsenic for all conditions. Elemental sulfur was pre-wetted with acetone before being added to the arsenic-contaminated water.

The six jars were placed in a mixing unit and filled with two liters each of arsenic-contaminated water with an initial pH of 8.87 for the first and second sets. No pH adjustments were made. The residence times were 15, 30 and 45 minutes and the iron-to-sulfur ratios were 1:0 (no elemental sulfur), 2:1 and 4:1. The two sets of six jars were stirred rapidly in the mixing unit at 300 rpm. After the appropriate residence time, water from each jar was filtered into 250-ml sample bottles and sent to a certified water quality laboratory for analysis of dissolved arsenic. The laboratory analysis indicated that the conditions without sulfur addition (an Fe:S ratio of 1:0) produced the lowest arsenic concentration in this experiment. Sulfur was present in the untreated water in the form of sulfate at a concentration of 200 mg/L as sulfate.

EXAMPLE 14

Jan. 28, 1998

| TIME (min) | ACTIVITY | pH | TEMP (° F.) | LAB NOTES | As (mg/L) |
|---|---|---|---|---|---|
| | Begin first set. | | | | |
| −15 | Add 2 L of Wharf water to 6 jars. | 8.87 | 68 | Yellow tinged water | 0.112 |
| −1 | Pre-wet S with acetone. | | | | |
| 0 | Increase speed of mixing unit to 300 rpm. | | | | |
| 0 | Add 0.25 g Fe, Grade B and varying dosages of S pre-wetted in acetone. | 8.76 | | | |
| 15 | Filter sample jars with 15-min. residence time. | 8.74 | | Yellow tinged water | |
| 30 | Filter sample jars with 30-min. residence time. | 8.71 | | Yellow tinged water | |
| | Begin second set. | | | | |
| −15 | Clean jars and add 2 L of Wharf water to 6 jars. | 8.78 | 68 | Yellow tinged water | |
| −1 | Pre-wet S with acetone. | | | | |
| 0 | Increase speed of mixing unit to 300 rpm. | | | | |
| 0 | Add 0.25 g Fe, Grade B, and varying dosages of S pre-wetted in acetone. | 8.75 | | | |

| | -continued | | |
|---|---|---|---|
| 15 | Filter sample jars with 15-min. residence time. | 8.73 | Yellow tinged water |
| 30 | Filter sample jars with 30-min. residence time. | 8.69 | Yellow tinged water |
| 45 | Filter sample jars with 45-min. residence time. | 8.66 | Yellow tinged water |

| | DISSOLVED ARSENIC CONCENTRATION (mg/L) | | |
|---|---|---|---|
| Residence | | Fe:S ratio | |
| Time (min) | 1:0 (No S) | 2:1 | 4:1 |
| 15 | 0.050, 0.049, 0.048 | 0.059 | 0.061 |
| 30 | 0.047 | 0.058 | 0.064 |
| 45 | 0.045 | 0.056 | 0.063, 0.057 |

Hence, this example demonstrates that when sulfur is present in the untreated water in the form of a sulfate in concentrations as low as 200 mg/L, that iron which is not sulfur-modified is effective in training water.

EXAMPLE 15

Arsenic in Mining Water

Example 15 used a similar sample water source as Example 12, but with higher arsenic levels (1.2 mg/L). Example 15 used a similar sample water source as Example 12, but with higher As levels (1.2 mg/L). Variables for these batch experiments included two types of iron, Grade B and Grade A (MH-100, a coarser iron, particles about twice as large); iron-to-arsenic ratios between 2000:1 and 16,000:1; and iron-to-sulfur ratios of 1:1 and 2:1. Since it had previously been determined that the arsenic was in the $As^{5+}$ form, the addition of an oxidizing agent such as hydrogen peroxide was deemed unnecessary and therefore was omitted from this experiment. No adjustments were made to the initial pH of 8.4.

Iron and sulfur were mixed in deionized water for 25 minutes in all conditions. The iron, sulfur and contaminated water were then mixed at 300 rpm for 60 minutes. After a settling water from each jar was filtered into 250-ml sample bottles and sent to a certified water quality laboratory for analysis of dissolved arsenic. For all conditions, dissolved arsenic was below the laboratory detection limit of 0.005 mg/L.

EXAMPLE 15

April 1997

| TIME (min) | ACTIVITY | pH | TEMP (° F.) | LAB NOTES | As (mg/L) |
|---|---|---|---|---|---|
| | Begin first set. | | | | |
| −25 | Pre-wet Fe and S with DI water. | 8.4 | 68 | | 1.2 |
| 0 | Increase speed of mixing unit to 300 rpm. | | | | |
| 0 | First jar: add 4.8 g Fe, Grade A and 4.8 g S. | | | | |
| 0 | Second jar: add 4.8 g Fe, Grade A and 2.4 g S. | | | | |
| 0 | Third jar: add 38.4 g Fe, Grade A and 38.4 g S. | | | | |
| 0 | Fourth jar: add 38.4 g Fe, Grade A and 19.2 g S. | | | | |
| 60 | Let water settle 10 minutes. | 7.8 | | | |
| 70 | Filter samples from each jar. | | | | ND |
| | Begin second set. | | | | |
| −25 | Pre-wet Fe and S with DI water. | 8.4 | 68 | | 1.2 |
| 0 | Increase speed of mixing unit to 300 rpm. | | | | |
| 0 | First jar: add 4.8 g Fe, Grade B and 4.8 g S. | | | | |
| 0 | Second jar: add 4.8 g Fe, Grade B and 2.4 g S. | | | | |
| 0 | Third jar: add 38.4 g Fe, Grade B and 38.4 g S. | | | | |
| 0 | Fourth jar: add 38.4 g Fe, Grade B and 19.2 g S. | | | | |
| 60 | Let water settle 10 minutes. | 7.8 | | | |
| 70 | Filter samples from each jar. | | | | ND |

| JAR | Fe TYPE | Fe:As RATIO | Fe:S | DISSOLVED ARSENIC CONCENTRATION (mg/L) |
|---|---|---|---|---|
| 1 | MH 100 | 2000:1 | 1:1 | ND |
| 2 | MH 100 | 2000:1 | 2:1 | ND |
| 3 | MH 100 | 16000:1 | 1:1 | ND |
| 4 | MH 100 | 16000:1 | 2:1 | ND |
| 1 | Grade B | 2000:1 | 1:1 | ND |

-continued

| | | | | |
|---|---|---|---|---|
| 2 | Grade B | 2000:1 | 2:1 | ND |
| 3 | Grade B | 16000:1 | 1:1 | ND |
| 4 | Grade B | 16000:1 | 2:1 | ND |

As with examples 12-14, this example demonstrates effective results without addition of an oxidizing agent.

EXAMPLE 16

Arsenic in Mining Water

Example 16 used the same treatment scheme as Example 12 except no adjustments were made to the initial pH of 9.3. The sample water was also obtained from the Wharf Mine. Grade B iron and elemental sulfur were mixed in deionized water at a 1:1 ratio for 30 minutes (Example 12 had 2:1 Fe:S ratio). The Fe:As ratios were 960:1, 480:1, 240:1, 96:1, 48:1 and 24:1.

Six jars in a mixing unit were filled with two liters each of arsenic-containing water. Varying quantities of Grade B iron and elemental sulfur were added to each jar. The jars were stirred rapidly in a mixing unit at 300 rpm for 24 hours. After 24 hours, the treated water from each jar was filtered into 250-ml sample bottles and sent to a certified water quality laboratory for analysis of dissolved arsenic.

The used iron/sulfur sludge from the experiment was combined into one sample for Toxicity Characteristic Leaching Procedure (TCLP) analysis. The resulting arsenic concentration was less than the reporting limit of 0.5 mg/L, which meant it easily passed the TCLP criteria for arsenic of 5 mg/L. Therefore, this sludge would be classified as non-hazardous waste.

EXAMPLE 16

August 1997

Furthermore, this example demonstrates effective removal of arsenic at pH levels as high as 9.3. This a significantly wide effective pH range, and these results considered along with Examples 1-11 tend to indicate that a pH range of about 3.5 to about 10.0 is effective.

EXAMPLE 17

Arsenic in Mining and Drinking Water

This example used the same sample water as Example 12, but the water was "spiked" with 1 mg/L arsenic adding 94 ml of arsenic trioxide to 25 gallons of Wharf mire water. The sample water was treated for removal of arsenic by continuous flow through a 16-inch packed-bed column (composed of 15% wt. Grade B iron, 0.15% wt. elemental sulfur and 84.85% wt. silicia sand). The middle 10 inches of the column were packed with an iron/sulfur/sand mixture. The top and bottom 3 inches of the column were packed with pure silicia sand. The inside diameter of the column was 9/16 of an inch. The porosity of the silica sand was 0.4. The pH of the untreated water was 7.78.

Untreated water was pumped into the column at a flow rate of 1.5 ml/min, generating a packed-bed residence time of approximately 15 minutes. A beaker was placed at the end of the column for effluent collection. Influent and effluent pH values were measured weekly. Initially, samples were collected daily and sent to a certified water quality laboratory for analysis of dissolved and total arsenic and iron. Since no iron was detected after the first week, the remaining samples were only analyzed for total arsenic and collected every other day. After about two weeks of operation, the "spiked"

| TIME (min) | ACTIVITY | pH | TEMP (° F.) | LAB NOTES | As (mg/L) |
|---|---|---|---|---|---|
| −30 | Pre-wet Fe and S with DI water | 9.3 | 68 | | 2.5 |
| 0 | Increase speed of mixing unit to 300 rpm. | | | | |
| 0 | First jar: add 4.8 g Fe, Grade B and 4.8 g S. | | | | |
| 0 | Second jar: add 2.4 g Fe, Grade B and 2.4 g S. | | | | |
| 0 | Third jar: add 1.2 g Fe, Grade B and 1.2 g S. | | | | |
| 0 | Fourth jar: add 0.48 g Fe, Grade B and 0.48 g S. | | | | |
| 0 | Fifth jar: add 0.24 g Fe, Grade B and 0.24 g S. | | | | |
| 0 | Sixth jar: add 0.12 g Fe, Grade B and 0.12 g S. | | | | |
| 1440 | Filter samples from each jar. | | | | |

| JAR | Fe:As RATIO | DISSOLVED ARSENIC CONCENTRATION (mg/L) |
|---|---|---|
| 1 | 960 | ND |
| 2 | 480 | ND |
| 3 | 240 | 0.005 |
| 4 | 96 | 0.680 |
| 5 | 48 | 1.420 |
| 6 | 24 | 1.430 |

This example also demonstrates that although less effective, the use of lower iron concentration can still yield significant and valuable reductions of arsenic levels.

Wharf water was replaced with "spiked" tap water which also contained 1 mg/L arsenic. All arsenic was present in the reduced form, $As^{3+}$, but an oxidizing agent was not added.

EXAMPLE 17

February-March 1998

| TIME (day) | ACTIVITY | pH | TEMP (° F.) | LAB NOTES | As (mg/L) |
|---|---|---|---|---|---|
| 0 | Make up column, 3 in. sand on either end, 10 in. sand/Fe/S mix in middle. | | | | |
| 0 | Set pump flow at 1/5 ml/min. | | | | |
| 0 | Measure pH influent. | 7.78 | 68 | | |
| 0 | Take influent sample, filtered. | 7.78 | 68 | | 0.912 |
| 0 | Turn on pumps. | | | | |
| 1 | Take influent sample, filtered and unfiltered. | 7.78 | | | 0.820 |
| 1 | Take effluent samples, filtered and unfiltered, | 8.21 | | Yellow tinged water | 0.019, 0.032 |
| 2 | Take effluent samples, filtered. | 8.16 | | Yellow tinged water | ND, ND |
| 6 | Take effluent sample, unfiltered. | | | Yellow tinged water, Fe beginning to oxidize | 0.027 |
| 7 | Take influent sample, filtered. | | | | 0.330 |
| 7 | Take effluent sample, unfiltered. | | | Yellow tinged water | 0.033 |
| 8 | Take effluent sample, unfiltered. | 8.40 | | Yellow tinged water | 0.046 |
| 9 | Take influent sample, unfiltered. | | | | 0.272 |
| 9 | Take effluent sample, unfiltered. | 8.45 | | Yellow tinged water | 0.043 |
| 12 | Take influent sample, unfiltered. | 8.20 | | | 0.156 |
| 12 | Take effluent sample, unfiltered. | 8.45 | | Yellow tinged water | 0.057 |
| 13 | Make up new mixture of "spiked" tap water. | | | | |
| 13 | Take influent sample, unfiltered. | 6.85 | | | 0.195 |
| 14 | Take effluent sample, unfiltered. | 7.02 | | Yellow tinged water | 0.076 |
| 16 | Take effluent sample, unfiltered. | 7.02 | | Yellow tinged water | 0.038 |

The influent concentration of untreated water decreased over time but remained greater than 0.150 mg/L. Effluent arsenic removal was obtained in the column, as effluent concentrations ranged from 0.076 mg/L to below the detection limit of 0.005 mg/L. An oxidizing agent was not added, and this was the only experiment treating water with arsenic in its reduced state, $As^{3+}$. This example demonstrates that the treatment of water in a reactor column packed with an inert medium, in this case sand, may afford increased permeability and yield effective results in a continuous flow operation over extended periods of time.

In all of Examples 12 to 17, no oxidizing step was used. The examples show very effective arsenic removal without the oxidizing step, for both the arsenate and arsenite forms of arsenic in water.

Additional tests were made to test certain parameters of the process. These tests are reflected in Examples 12 to 17.

EXAMPLE 18

November 2000 Start

A field pilot test for removal of arsenic was conducted for three months using specially-programmed off-the-shelf pressure filtration equipment, specifically, water-softening vessels, valves and pumps. Water was taken from a ground water well producing domestic water for a public water system in the Central Valley of California. This water was treated in a pressure filter and wasted to a designated disposal area. Approximately 170,000 gallons was put through a 12-inch diameter pressure column with a 24-inch SMI bed depth at a flow rate of 2.8 gallons per minute. Empty Bed Contact Time was approximately 4 minutes. The influent concentration was 0.018mg/L As and the effluent concentration was <0.002 mg/L throughout the test. The test was stopped prior to breakthrough.

Additional field pilot testing has been undertaken for nitrate and arsenic removal from drinking water. Field testing for removal of chrome VI has also been performed, results being shown on the two tables below. These tests prove SMI effectiveness under field conditions for direct scale-up to production equipment to meet urgent water treatment needs.

Numerous laboratory column tests were conducted to test the effectiveness of SMI for removal of contaminants from industrial wastewater and domestic water supplies. Some of these tests are summarized in two tables which follow: "Summary of SMI Laboratory Testing" and "Laboratory Development Studies of SMI."

Prima Environmental, an applied sciences and technology laboratory, performed the tests summarized in the tables. The test column was configured as shown in the accompanying drawing, FIG. 4.

Typically, 50 grams of SMI Mix 1,3, 4, or 5 was placed between 10 g of clean 90-mesh silica sand. One flow rate used for the columns was 2.3 to 2.5 mL/min. Contact time at that rate of flow was 5 minutes. Other flow rates were used in some of the tests to obtain differing contact times.

SMI mixes 1-5 were prepared as follows:

All mixes were prepared in a laboratory, using sponge iron (designated No. 423A, Hoeganaes) and sulfur, 200 grams iron and 12 grams sulfur, a ratio of about 16.7:1 or 17:1. The iron and sulfur were mixed with a sufficient quantity of deionized water to keep the mixture continuously moist, and to start the reaction, and sufficient deionized water to keep the reaction going continuously, with continuous mixing. Water was sometimes added after start of the reaction. Mixing was performed by hand with a paddle mixer. In addition, heat was added to the vessel, so that the water and the reagents were heated to an elevated temperature, which varied from mix to mix as noted in the table below. Approximately 10 to 50 ml of water were used in mixes.

Completion of the reaction was indicated by the cessation of gas, which is given off during the reaction, and the color of the reacted SMI, which is very black.

| Mix Number | Temperature | Duration of Mixing |
|---|---|---|
| 1 | 80° F. | 10 minutes |
| 2 | 100° F. | 20 minutes |
| 3 | 120° F. | 20 minutes |
| 4 | 140° F. | 30 minutes |
| 5 | 140° F. | 30 minutes |

Following the completion of the reaction in each mix, the mix was cooled, during which the SMI essentially dried. The SMI was then sealed in packaging to prevent oxidation.

The various mixes were prepared under the conditions stated above to determine the efficacy of using heat and water to produce a fully-reacted SMI. Generally the results showed that the reaction producing SMI went to completion more quickly using heat to elevate the temperature as compared with reactions started at room temperature, and that the efficacy of the resulting SMI was not adversely affected.

Figure 4:
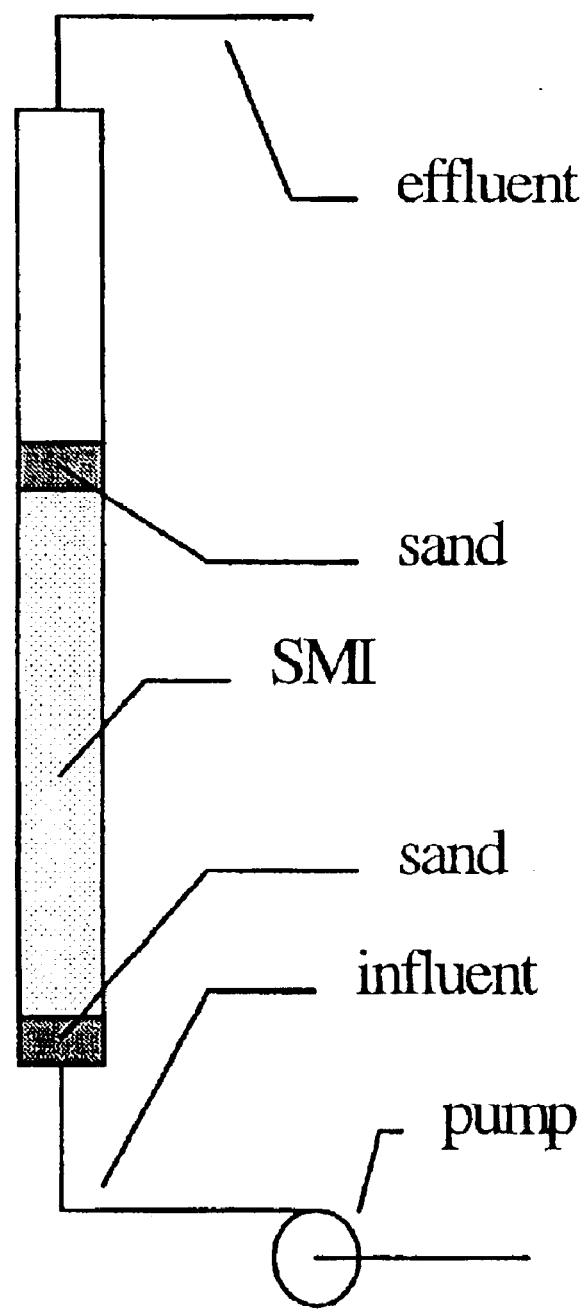
FIG. 4 is a schematic elevation view showing a filter-like contactor as a reaction vessel.

The SMI mixes were used by placing each mix into a separate small reactor column, essentially as shown in FIG. 4.

Laboratory Development Studies of SMI

| Contaminant | Water Source | EBCT min | Influent mg/L | Effluent mg/L | % Removal | Capacity mg/g SMI |
|---|---|---|---|---|---|---|
| As(III)/As(V) | DI | 10 | 2.7 | <0.005 | 100 | 2 |
| Total As | IWW | 17 | 17 | <0.01 | 100 | 3 |
| Total As | GW | 7 | 11 | <0.005 | 100 | n.m. |
|  |  | 23 | 11 | <0.005 | 100 |  |
| Nitrate | GW | 7 | 32 | 30 | 6 | n.m. |
|  |  | 23 | 32 | 19 | 41 |  |
| Nitrate | DI | 27 | 53 | 35 | 34 | n.m. |
|  |  | 31 | 53 | 13 | 75 |  |
| Cr(VI) | DI | 6 | 0.9 | <0.02 | >98 | n.m. |
| Copper | DI | 5 | 10 | <0.1 | >99 | >2 |
| Trichloroethene | GW | 28 | 0.008 | <0.001 | >87 | n.m. |

NOTES:
DI = deionized water; IWW = industrial wastewater; GW = groundwater; EBCT = empty bed contact time; n.m. = not measured; all nitrate concentrations as nitrate An improved process for producing SMI minimizes water content in formation of the pre-mix, and takes advantage of the exothermic reaction, utilizing heat to reduce reaction time.

In some of the examples above the pre-mix preparation involved a significant amount of water, with the reagents placed into water to form a wet slurry. The water fraction of the mix was very much larger than the sulfur and iron fraction. A variation, used in Example 18 above, speeds reaction time and reduces the bulk of the resulting SMI product, by virtual elimination of water. By this method only enough water is present to moisten the iron and the sulfur, the moisture not filing all the interstices among the iron and sulfur particles in the mix. The SMI reaction is exothermic, and with minimal water present, this exothermic reaction significantly heats the mix, speeding the reaction time. The elevated temperature may create a different chemical result and chemical bonding properties, since temperatures above about 100° F. usually result in sulfur being present in the "thio" form.

SUMMARY OF SMI LABORATORY TESTING

| | | Reaction Conditions | | |
|---|---|---|---|---|
| Date | Purpose | SMI | Other | Results Summary |
| Dec. 11, 1998 | Compare ability of various SMI types to remove TCE, CF, nitrate, sulfate | MH 100, Grade B, Castwell iron + sulfur | — | All compounds at least partially removed |
| Dec. 16, 1998 | Effect of SMI on nitrate, use of 1824 gum as suspending agent | Grade B iron + sulfur | — | Nitrate > 90% removed with contact time of 12 minutes |
| Dec. 16, 1998 | Perchlorate removed | iron + sulfur | — | No perchlorate removed; conditions not optimized |
| Feb. 24, 2000 | Batch test to compare SMI S4 & S6 for As removal | S4 & 56 | — | S6 slightly better than S4; As loading ranged from 0.56–4.5 mg/g SMI depending upon initial As conc. |
| Apr. 05, 2000 | Compare Mix 1, 3, & 4 for As removal | Mix 1, 3, & 4 | 25 ppm As | As < 0.005 mg/L at 2 hours; 3.6–7.9 mg/L at 44 hours; est. As loading 2–3 mg/g SMI, depending upon assumptions |
| Apr. 01, 2000 | Column test for Mix 4, As removal | Mix 4 | 2.5 ppm As | As < 0.005 mg/L for 10 days; loading about 3 mg As/g SMI |
| May 01, 2000 | Mix 4 tap water, As removal | Mix 4 | 2.5 ppm As | As < 0.005 mg/L for < 5 days; complete clogging by 7 days |
| May 01, 2000 | Mix 5 deionized water, As removal | Mix 5 | 2.5 ppm As | As < 0.005 mg/L for 8–11 days; stirred SMI when effluent was 0.050 mg/L, but this did not reduce As concentration |
| Jun. 06, 2000 | Removal of nitrate | Mix 5 | 11 ppm Nitrate | 32% nitrate removal with 5 min contact time; can probably improve removal if increase contact time |

The reaction can be allowed to heat up to about 140° to 180° F., but should not be allowed to go significantly higher because of the risk of explosion. The temperature can accelerate to the extent that the higher temperatures continue to speed the reaction time, causing even more heat to be released, rapidly drying the water into steam and causing an explosion. Cooling can be used, such as cooling coils around the reaction vessel, to control the temperature if needed. Another important aspect of the process is to blend the mixture occasionally or continuously, to distribute the heat generated in the process and minimize hot spots. This can be done in commercial quantities using a rotating drum, for example.

In a preferred procedure the initial moisture is minimized, only sufficient to moisten the iron and sulfur mixture, and as the heat of reaction raises the temperature, further water can be added if and as needed. The mixture can be allowed to begin on its own, or, to hasten the start of the reaction, heat can be initially added, to raise the initial temperature to between about 80° F. and 140° F. The reaction will then continue, with proper blending, to completion unless the water completely dries, and the reaction can then be continued by addition of water. In this way, the water content and the addition of water can control the speed of the reaction.

This method results in a savings in cost and time, in that the reaction time is lessened and the pre-mix dries from its heat of reaction, no separate drying process being necessary. This dry pre-mix is less bulky and is easier to pack, ship and store.

Thus, in an implementation of the above described method, elemental powdered sponge iron is mixed with dry powdered sulfur and water in a container. The water quantity is only sufficient to keep the resulting mixture moist and to stimulate a reaction, not filling all interstices in the iron and sulfur particles. Heat is added to initiate the reaction, if desired, although this is not necessary. The reaction is exothermic and builds up heat in the mixture, as noted above. The method allows the heat of the reaction to elevate the temperature of the mixture, speeding the reaction. The mixture is occasionally or continuously blended, to distribute heat and prevent hot spots in the mixture. Also, the mixture is controlled to prevent overheating; blending assist in this control, but cooling can be used if necessary, and limitation of water content, with addition of water as needed, can also control the speed and heat of reaction.

Once the reaction is complete, the resulting SMI mix is relatively dry. This SMI product is cooled (which can be by allowing it to cool to near ambient) and packed in a sealed container to prevent oxidation, then shipped and/or stored, or put into a contact bed, in the form of a particulate bed through which water can be passed. Then, in use of the contact bed, water containing dissolved contaminants is passed through the bed. Contact is maintained between the water and the particulate sulfur-modified iron in the contact bed sufficient to effect removal of at least a part of the contaminants in the water, by adsorption and absorption onto the sulfur-activated iron particles.

The above-described preferred embodiments are intended to illustrate the principles of the invention, but not to limit its scope. Other embodiments and variations to these preferred embodiments will be apparent to those skilled in the art and may be made without departing from the spirit and scope of the invention as defined in the following claims.

I claim:

1. A method for preparing a sulfur-modified iron pre-mix, comprising:

mixing elemental powdered sponge iron, dry powdered sulfur and water in a container, the water quantity being only sufficient to keep the resulting mixture moist and to stimulate a reaction, not filling all interstices among the iron and sulfur particles in the mix and causing an exothermic reaction, allowing the heat of the reaction to increase the temperature of the mixture, but not to a significantly higher temperature than about 180° F., blending the mixture at least occasionally during the reaction, until completion of the reaction, and adding water if and as needed to maintain the reaction, and thus forming a concentrated sulfur-modified iron pre-mix including sulfur-activated sponge iron particles.

2. The method of claim 1, further including controlling the temperature of the reaction by cooling the mixture in the container during the reaction.

3. The method of claim 1, further including initially heating the iron, sulfur and water mixture in the container to start the reaction, then allowing the exothermic nature of the reaction to further elevate the temperature of the mixture.

4. The method of claim 3, wherein the temperature to which the mixture is initially heated is above about 80° F.

5. The method of claim 1, wherein the iron and sulfur are added in a quantity at a weight ratio of about 17:1.

* * * * *